Patented Sept. 23, 1947

2,427,658

UNITED STATES PATENT OFFICE 2,427,658

AMINE SALTS OF TRICHLORO-2-HYDROXY-DIPHENYL

Gerald H. Coleman, Midland, Mich., and Wesley D. Schroeder, Maplewood, N. J., assignors to The Dow Chemical Company, Midland, Mich., a corporation of Michigan No Drawing. Application October 16, 1943, Serial No. 506,580

5 Claims. (Cl. 260—567.5)

The present invention relates to amine salts of a 3.5.x-trichloro-2-hydroxy-diphenyl melting at 117°–118.5 C. and is particularly concerned with compounds having the following formula:

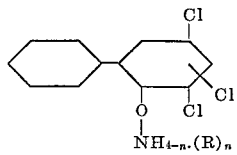

wherein each R is selected from the group consisting of alkyl, cycloalkyl, aralkyl, and hydroxyalkyl radicals, and $n$ is an integer not greater than 3. These compounds are useful as parasiticides and as stabilizers in ethers and plastic compositions.

We have prepared representative members of the above-identified group of compounds and found them to be crystalline white solids or viscous liquids somewhat soluble in many organic solvents, and relatively insoluble in water. These compounds are comparatively stable to light and air, are not appreciably affected by carbon dioxide, and are non-corrosive to the skin of humans and higher animals.

The new compounds are prepared by reacting a suitable amine compound such as N.N-dibutyl amine, triamyl amine, octyl amine, cyclohexyl amine, N-cyclohexyl-dimethyl amine, N-propyl-diethanol amine, β-phenylethyl amine, N-benzyl-cychohexyl amine, benzyl amine, diethanol amine, triethanol amine, N-cychohexyl-N-benzyl-ethyl amine, N-phenyl-N-butyl-ethanol amine, etc., with a trichloro-2-hydroxy-diphenyl melting at 117°–118.5° C. Substantially equimolecular portions of the trichloro-2-hydroxy-diphenyl and amine have been found to give the desired salts in good yield, although any suitable amounts may be employed. Where an excess of one or the other reactant is present, purification may be accomplished by extracting the crude salt product with a selective solvent for the trichloro-2-hydroxy-diphenyl, amine, or amine salt. In most instances, however, the crude reaction product, consisting essentially of the amine salt, is adapted to be employed as a parasiticidal toxicant or stabilizer without further treatment.

In preparing the foregoing compounds, a solvent such as benzene, chlorobenzene, toluene, petroleum ether, or alcohol may be employed in the reaction mixture. The operating temperatures are not critical and may vary from room temperature to about 120 C. When a solvent is employed, the reaction is conveniently carried out at the refluxing temperature of the reaction mixture. The reactants may simply be mixed together to accomplish the reaction which is accompanied by the development of considerable heat. Where the crude product is crystalline, purification may be accomplished by crystallization from various organic solvents and mixtures of solvents. When a liquid product is obtained, it may be clarified by treatment with bone charcoal or absorbent earths, if desired.

The following examples set forth specific embodiments of the invention but are not to be construed as limiting the same.

Example 1

27.34 grams (0.1 mol) of 3.5.x-trichloro-2-hydroxy-diphenyl melting at 117 –118.5° C. was dissolved in 50 milliliters of hot petroleum ether. 9.9 grams (0.1 mol) of cyclohexyl amine was added to the petroleum ether solution with stirring and the mixture cooled to room temperature. The amine salt precipitated from solution and was recovered by filteration, whereby there was obtained 28 grams of a product melting at 137.5°–138.5° C. The monocyclohexyl amine salt of 3.5.x-trichloro-2-hydroxy-diphenyl was found to be slightly soluble in water, soluble in 95 per cent ethyl alcohol, and insoluble in carbon tetrachloride and kerosene.

Example 2

In a similar manner 0.1 molar amounts of the 3.5.x-trichloro-2-hydroxy-diphenyl and N.N-dicyclohexyl amine were reacted together in petroleum ether to obtain 40.5 grams of the N.N-dicyclohexyl amine salt of 3.5.x-trichloro-2-hydroxy-diphenyl as a white crystalline compound melting at 155.5°–157 C. This product is insoluble in water; carbon tetrachloride and kerosene, and soluble in 95 percent ethyl alcohol.

18.2 parts by weight of this compound was ground with 72.7 parts of diatomaceous earth and 9.1 parts of sodium lauryl sulphate. The resulting concentrate was diluted with sufficient water to give a concentration of 0.5 pound of amine salt per 100 gallons. This spray gave a kill against Colorado potato beetle larvae of 82 per cent.

Example 3

12.85 grams of the long chain aliphatic amines obtained by the carboxylic reduction and ammonification of the mixed acids derived from the hydrolysis for coconut oil, and 27.3 grams of the 3.5.x-trichloro-2-hydroxy-diphenyl were mixed together and heated at 60°–70° C. for approximately 1 hour. The mixture was then cooled to room temperature to obtain a quantitative yield of the coconut oil amine addition salt of 3.5.x-trichloro-2-hydroxy-diphenyl product as a semisolid grease insoluble in water, slightly soluble in kerosene, and soluble in carbon tetrachloride and 95 per cent ethyl alcohol.

*Example 4*

27.34 grams (0.1 mol) of the 3.5.x-trichloro-2-hydroxy-diphenyl and 16.1 grams (0.1 mol) of N-normalbutyl-diethanol amine were mixed together and heated at 70°–80° C. for approximately 1 hour. Upon cooling there was obtained a dark red viscous oil having a density at 25° C. of 1.198 grams per cubic centimeter. This N-normalbutyl-diethanol amine addition salt of 3.5.x-trichloro-2-hydroxy-diphenyl product was insoluble in water, slightly soluble in kerosene, and soluble in 95 per cent ethyl alcohol and carbon tetrachloride.

This product was dispersed in a 2 per cent oil emulsion in amount sufficient to provide 1 pound of the amine salt per 100 gallons of emulsion to obtain a spray composition which gave a control of 80.6 per cent against the eggs of L. Kalmii stal.

*Example 5*

In a similar manner equimolecular proportions of N.N-di-normalbutyl-monoethanol amine and the 3.5.x-trichloro-2-hydroxy-diphenyl were reacted together to obtain a quantitative yield of the addition salt of the amine and phenol as a viscous dark oil having a density of 1.205 grams per cubic centimeter at 25° C. This product was insoluble in water, slightly soluble in kerosene, and soluble in 95 per cent ethyl alcohol and carbon tetrachloride.

*Example 6*

10.2 grams (0.05 mol) of N-benzyl-N-cyclohexylmethyl amine and 13.7 grams (0.05 mol) of the 3.5.x-trichloro-2-hydroxy-diphenyl were mixed together at room temperature. Heat was evolved from the mixture and the color darkened. The mixture was then warmed on a hot-plate at 80°–100° C. with stirring to obtain a dark red-brown product. This product was cooled to approximately 0° C. for a period of 24 hours but failed to crystallize. The tacky, resinous, N-benzyl-N-cyclohexy-methyl amine salt of 3.5.x-trichloro-2-hydroxy-diphenyl product was found to be soluble in water at 25° C. to the extent of 0.0145 gram per 100 milliliters. The saturated aqueous solution had a pH of 8.87. The compound was soluble in alcohol, carbon tetrachloride, benzene, and hot kerosene, and relatively insoluble in cold kerosene.

The 3.5.x-trichloro-2-hydroxy-diphenyl employed as a starting material in the preparation of the amine salts set forth in the foregoing examples was prepared by reacting 2-hydroxy-diphenyl with gaseous chlorine. In a representative preparation 0.5 mol of 2-hydroxy-diphenyl was dissolved in 45 milliliters of tetrachloroethylene and the solution heated to 90°–95° C. Chlorine gas was passed through the phenol solution at this temperature until the amount of hydrogen chloride evolved indicated the reaction of 3 mols of chlorine. The crude reaction product solidified upon cooling, and was dissolved in hot petroleum ether and recrystallized. After several recrystallizations, there was obtained a 49 per cent yield of 3.5.x-trichloro-2-hydroxy-diphenyl as a white solid melting at 117°–118.5° C.

This compound was substantially insoluble in water, slightly soluble in kerosene, and somewhat soluble in carbon tetrachloride and 95 per cent ethyl alcohol. Upon analysis, the phenol was found to contain 38.95 per cent chlorine as compared to a theoretical chlorine content of 39 per cent. The position of the third chlorine atom in the hydroxylated benzene ring was determined by the oxidation of the compound to form benzoic acid.

Other amines may be reacted with 3.5.x-trichloro-2-hydroxy-diphenyl substantially as described in the foregoing examples to obtain such compounds as the dibutyl amine salt, the triamyl amine salt, the octyl amine salt, the tricyclohexyl amine salt, the N-cyclohexyl-dimethyl amine salt, the N-propyl-diethanol amine salt, the β-phenylethyl amine salt, the N-benzyl-cyclohexyl amine salt, the benzyl amine salt, the diethanol amine salt, the triethanol amine salt, the N-cyclohexyl-N-benzyl-ethyl amine salt, the N-cyclohexyl-octyl amine salt, the N-benzyl-N-butyl-ethanol amine salt, the N-cyclohexyl-N-butyl-methyl amine salt, the N-cyclohexyl-N-amyl-(2-hydroxy-butyl) amine salt, the N-(cyclo(hexyl-cyclohexyl)-N-isopropyl-(4-chloro-benzyl) amine salt, and the N.N-diethyl-isopropanol amine salt. These compounds are all relatively insoluble in water and somewhat soluble in many organic solvents and have parasiticidal properties both for the control of insects and fungus pests.

The present application is a continuation-in-part of our copending application Serial No. 416,370, filed October 24, 1941.

We claim:

1. A compound having the formula

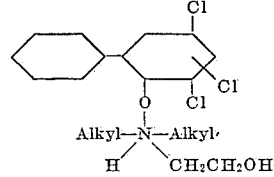

and prepared from a 3.5.x-trichloro-2-hydroxy-diphenyl melting at 117°–118.5° C.

2. A compound having the formula

HOCH₂CH₂—N—CH₂CH₂OH / H Alkyl and prepared from a 3.5.x-trichloro-2-hydroxy-diphenyl melting at 117°–118.5° C.

3. An N-normal-butyl-diethanol amine salt of a 3.5.x-trichloro-2-hydroxy-diphenyl having a density of 1.198 grams per cubic centimeter at 25° C. and prepared from a 3.5.x-trichloro-2-hydroxy-diphenyl melting at 117°–118.5° C.

4. An N.N-di-normal-butyl-monoethanol amine salt of 3.5.x-trichloro-2-hydroxy-diphenyl having a density of 1.205 grams per cubic centimeter at 25° C. and prepared from a 3.5.x-trichloro-2-hydroxy-diphenyl melting at 117°–118.5° C.

5. A compound having the formula wherein each R is selected from the group consisting of alkyl and hydroxy-alkyl radicals, and $n$ is an integer not greater than 3, and prepared from a 3,5,x-trichloro-2-hydroxy-diphenyl melting at 117°–118.5° C.

GERALD H. COLEMAN.
WESLEY D. SCHROEDER.

REFERENCES CITED

The following references are of record in the file of this patent:

UNITED STATES PATENTS

| Number | Name | Date |
|---|---|---|
| 2,222,486 | Moore | Nov. 19, 1940 |
| 2,189,420 | Hockenyos | Feb. 6, 1940 |
| 1,992,577 | Moness | Feb. 26, 1935 |
| 1,940,817 | Semon | Dec. 26, 1933 |
| 1,919,298 | Lehmann | July 25, 1933 |

FOREIGN PATENTS

| Number | Country | Date |
|---|---|---|
| 709,788 | France | Aug. 13, 1931 |